United States Patent
Ghioc et al.

(10) Patent No.: US 12,401,565 B1
(45) Date of Patent: Aug. 26, 2025

(54) AUTOMATIC SERVER PROVISION (71) Applicant: Lenovo Enterprise Solutions (Singapore) Pte. Ltd., Singapore (SG)

(72) Inventors: Constantin Cristian Ghioc, Bucharest (RO); Jay Bryant, Rochester, MN (US); Liviu Muresanu, Constanta (RO); Ionut-Dan Nica, Bucharest (RO)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/443,951

(22) Filed: Feb. 16, 2024

(51) Int. Cl.
*H04L 41/08* (2022.01)
*H04L 41/0806* (2022.01)

(52) U.S. Cl.
CPC ...... *H04L 41/0886* (2013.01); *H04L 41/0806* (2013.01)

(58) Field of Classification Search
None
See application file for complete search history.

(56) References Cited

U.S. PATENT DOCUMENTS

| | | | |
|---|---|---|---|
| 11,095,506 B1* | 8/2021 | Erblat | H04L 41/5058 |
| 2015/0341229 A1* | 11/2015 | Richter | G06F 9/44 |
| | | | 709/224 |
| 2020/0104222 A1* | 4/2020 | Ramamoorthi | G06F 11/00 |

* cited by examiner

*Primary Examiner* — Quang N Nguyen
(74) *Attorney, Agent, or Firm* — FERENCE & ASSOCIATES LLC (57) ABSTRACT

One embodiment provides a method, the method including: identifying, using a cluster management system, a server is physically connected to a network; determining, using the cluster management system, the server needs to be provisioned to a server cluster of the network utilizing cluster information corresponding to the network included within a catalog that is unique to an entity corresponding to the network and includes information related to the network, server clusters of the network, and parameters of the network and the server clusters; and automatically provisioning, using the cluster management system, the server for inclusion in the server cluster using configuration information included within the catalog. Other aspects are claimed and described.

16 Claims, 3 Drawing Sheets

AUTOMATIC SERVER PROVISION

BACKGROUND

Servers can be installed in a server cluster on a network. A server cluster is a group of servers that work together. The servers within a single server cluster are managed together and participate in workload management where work to be performed by the cluster is distributed across the servers within the cluster. Utilizing a server cluster provides many different benefits to an entity including performance benefits, increased memory and storage capacity, and/or the like. Additionally, the use of a server cluster reduces downtime for a server system. If a single of the servers within the cluster is rendered inoperable for any reason or any length of time, other servers within the cluster can pick up the workload of the down server with little to no interruption in service by the server cluster as long as the remaining servers have enough bandwidth to account for the workload of the down server.

BRIEF SUMMARY

In summary, one aspect provides a method, the method including: identifying, using a cluster management system, a server is physically connected to a network; determining, using the cluster management system, the server needs to be provisioned to a server cluster of the network utilizing cluster information corresponding to the network included within a catalog that is unique to an entity corresponding to the network and includes information related to the network, server clusters of the network, and parameters of the network and the server clusters; and automatically provisioning, using the cluster management system, the server for inclusion in the server cluster using configuration information included within the catalog.

Another aspect provides a system, the system including: a processor; a memory device that stores instructions that, when executed by the processor, causes the system to: identify, using a cluster management system, a server is physically connected to a network; determine, using the cluster management system, the server needs to be provisioned to a server cluster of the network utilizing cluster information corresponding to the network included within a catalog that is unique to an entity corresponding to the network and includes information related to the network, server clusters of the network, and parameters of the network and the server clusters; and automatically provision, using the cluster management system, the server for inclusion in the server cluster using configuration information included within the catalog.

A further aspect provides a product, the product including: a computer-readable storage device that stores executable code that, when executed by a processor, causes the product to: identify, using a cluster management system, a server is physically connected to a network; determine, using the cluster management system, the server needs to be provisioned to a server cluster of the network utilizing cluster information corresponding to the network included within a catalog that is unique to an entity corresponding to the network and includes information related to the network, server clusters of the network, and parameters of the network and the server clusters; and automatically provision, using the cluster management system, the server for inclusion in the server cluster using configuration information included within the catalog.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While server clusters provide extended benefits to entities, to get the most benefit from a server cluster, the server cluster has to be designed and operated so that a workload is balanced between the servers within the server cluster. Additionally, to account for a server becoming inoperable, the workload of the server cluster should be maintained below a predetermined threshold so that remaining servers have the bandwidth to take on a workload of the inoperable server. Additionally, as technology improves, old servers become obsolete or are unable to keep up with increasing demands and new servers must be incorporated into server clusters. Thus, there are many instances where a server may need to be added to an existing server cluster or a new server cluster with new servers needs to be created and implemented.

Currently adding servers to server clusters is a mostly manual process that requires significant user interaction to identify that a server has been physically connected to a network, expand an existing server cluster or create a new server cluster, and provision the server to be added to the server cluster. The user has to manually select the server that was connected to the network, manually select which cluster needs to be expanded, and then manually configure the server for the selected cluster. All of these manual steps are not only time consuming, but are also very error prone. This is a particular problem where more than one server has been physically added to the network. Adding more than one server to a network during a particular time period is extremely common. However, not all of these servers may be added to the same server cluster. Thus, there is the extremely error prone process of making sure the correct server is provisioned to the correct server cluster. Since different servers may have different performance characteristics, it is common that a server was chosen for a particular server cluster or server cluster type and not all of the servers added to the network may fulfill the requirements for a particular server cluster or server cluster type. Thus, choosing the incorrect server for a particular server cluster may result in a server cluster not performing as expected, rework to correct the problems caused by provisioning a server to the incorrect server cluster, and/or the like.

Some parts of provisioning a server to a server cluster have some automated techniques. For example, a user may run a script which will automatically perform some steps for provisioning a server to a server cluster. Typically, one step that is automated is the identification of the servers that were added to the network. Once all the servers are physically added to the network, a technician or other user can run a script that will perform automatic discovery of the servers that were added and provide a list to the technician identifying these added servers. The discovery may also provide some information regarding the identified servers (e.g., identifier, some performance characteristics, installed software/firmware identification, etc.), that may allow the user to better identify which server should be added to which server cluster. Thus, expanding a server cluster and provisioning a server to the server cluster remain manual processes.

Accordingly, the described system and method provides a technique for automatically provisioning a server to a server cluster on a network upon identifying a server has been physically connected to the network and determining that the server needs to be provisioned to a server cluster. The cluster management system can identify that a server has been physical connected to a network. This identification may be performed utilizing an automatic technique, for example, by periodically examining the network for servers that are not provisioned, for servers that were not previously included on the network, for components associated with servers that are now on the network, and/or the like. The identification may also be performed upon receipt of a trigger event that indicates the system should look for new servers on the network.

The cluster management system determines that the server that needs to be provisioned to a server cluster based upon cluster information corresponding to the network included in a catalog, dictionary, or other database. The catalog may identify information about the network which identifies a status of current server clusters, needs of current server clusters, requirements of current server clusters, and/or the like. In other words, the catalog includes information about the current network that may be used to identify to which server cluster a server should be provisioned. The catalog may also include configuration information that identifies how a server needs to be configured and provisioned to be added to a server cluster. Thus, the cluster management system can use the catalog to automatically provision the server to the identified server cluster. The configuration information may include firmware versions, operating and other systems to be installed on the server, configuration parameters and settings for the server, security settings, and/or the like. Provisioning the server to a server cluster may also include updating the catalog with the new information and notifying a user or technician that the server has been provisioned and information regarding the provisioning.

Therefore, a system provides a technical improvement over traditional methods for server provision. Rather than the mostly manual technique that is required by conventional solutions to identify added servers, expand server clusters, and provision servers to a particular server cluster, the described system and method allows for an automated process that can identify a server has been added to the network, identify which server cluster the server should be added to and expand that server cluster, and provision the server to the expanded server cluster. Thus, the described system provides a more accurate and less error-prone technique for adding servers to server clusters than the traditional manual techniques. Additionally, since the system is automated, the provision of servers to server clusters can be performed without user input, thereby allowing technicians and other users to perform other tasks while the servers are provisioned to server clusters.

Additionally, since the described system and method does not require user input, provisioning servers to server clusters can be performed at times which may be most suitable for modifying server clusters. In other words, instead of performing server provisioning during normal technician work hours, the server provisioning can be performed over night or at times when the servers may have decreased workloads which may reduce any detrimental effects (e.g., server downtime, reduced access to files, reduced server performance, etc.) that the server provisioning may have on other users who may be accessing the servers. Thus, the described system and method is a more efficient, accurate, and less obtrusive as compared to traditional server provisioning techniques.

The illustrated example embodiments will be best understood by reference to the figures. The following description is intended only by way of example, and simply illustrates certain example embodiments.

Figure 1:
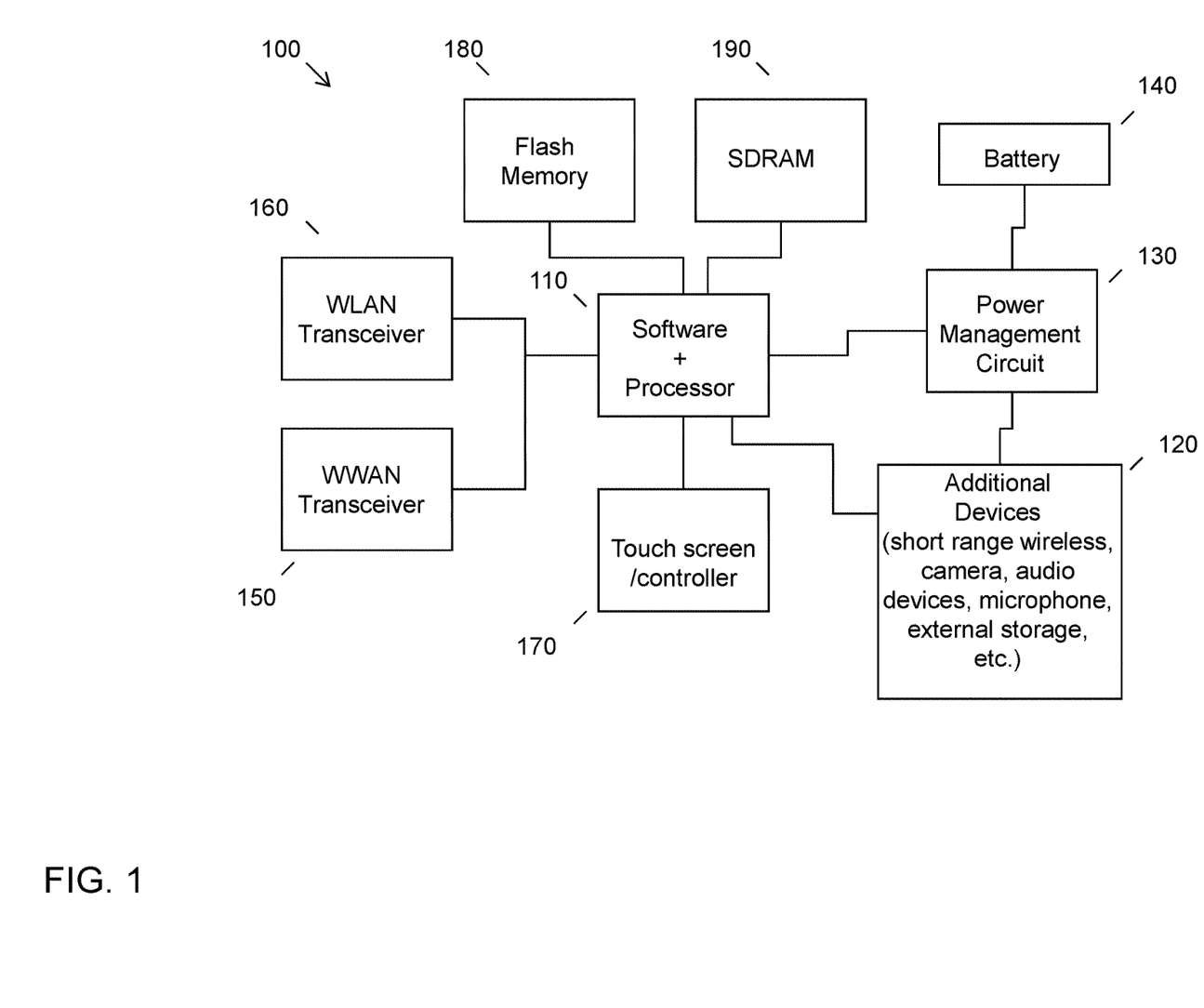
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
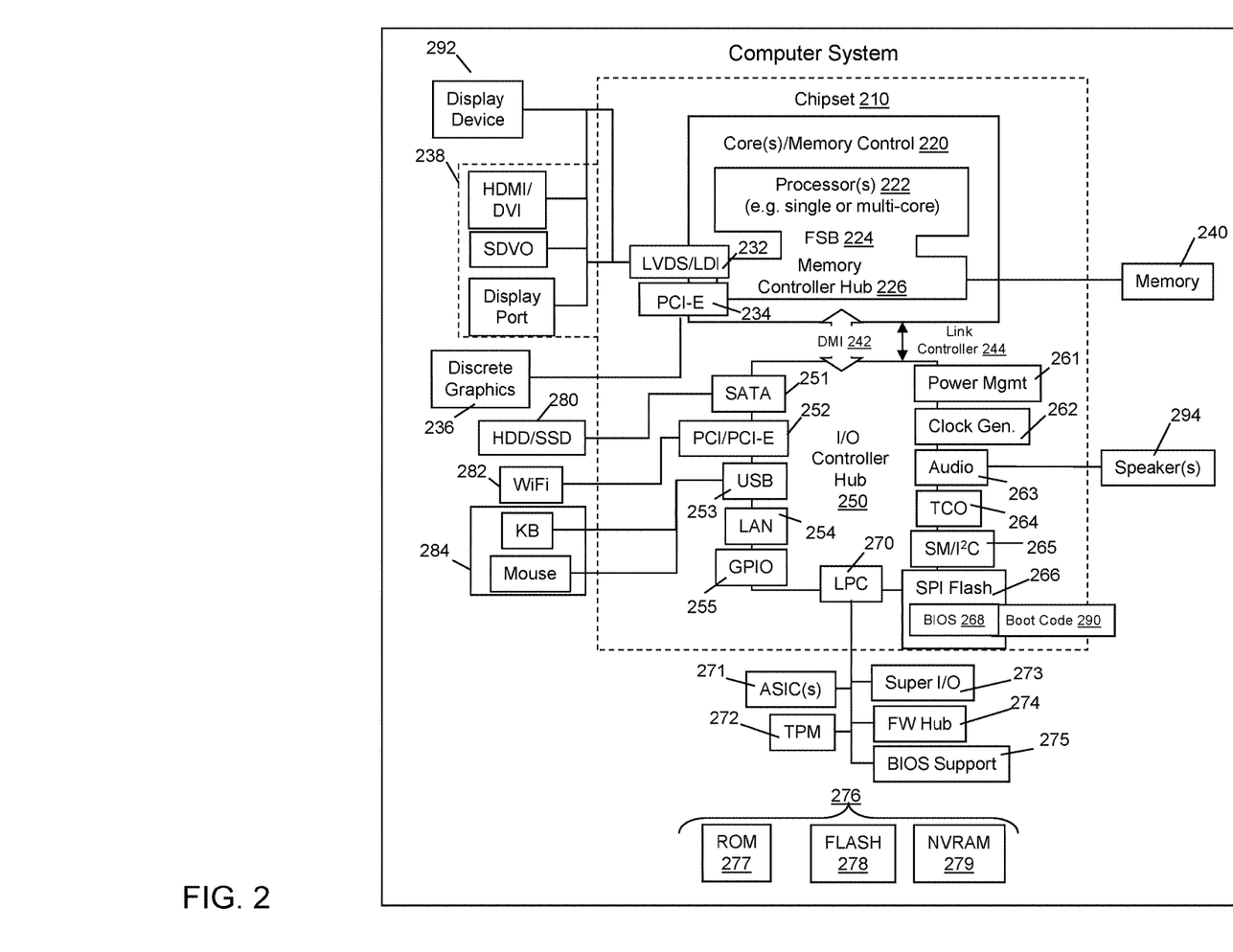
FIG. 2 illustrates another example of information handling device circuitry.

FIG. 2 depicts a block diagram of another example of information handling device circuits, circuitry, or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in devices or systems associated with servers and networks to which servers may be added or provisioned and devices or systems that may assist in identifying servers to be provisioned and provisioning the servers. For example, the circuitry outlined in FIG. 1 may be implemented in a tablet or smart phone embodiment, whereas the circuitry outlined in FIG. 2 may be implemented in a personal computer embodiment.

Figure 3:
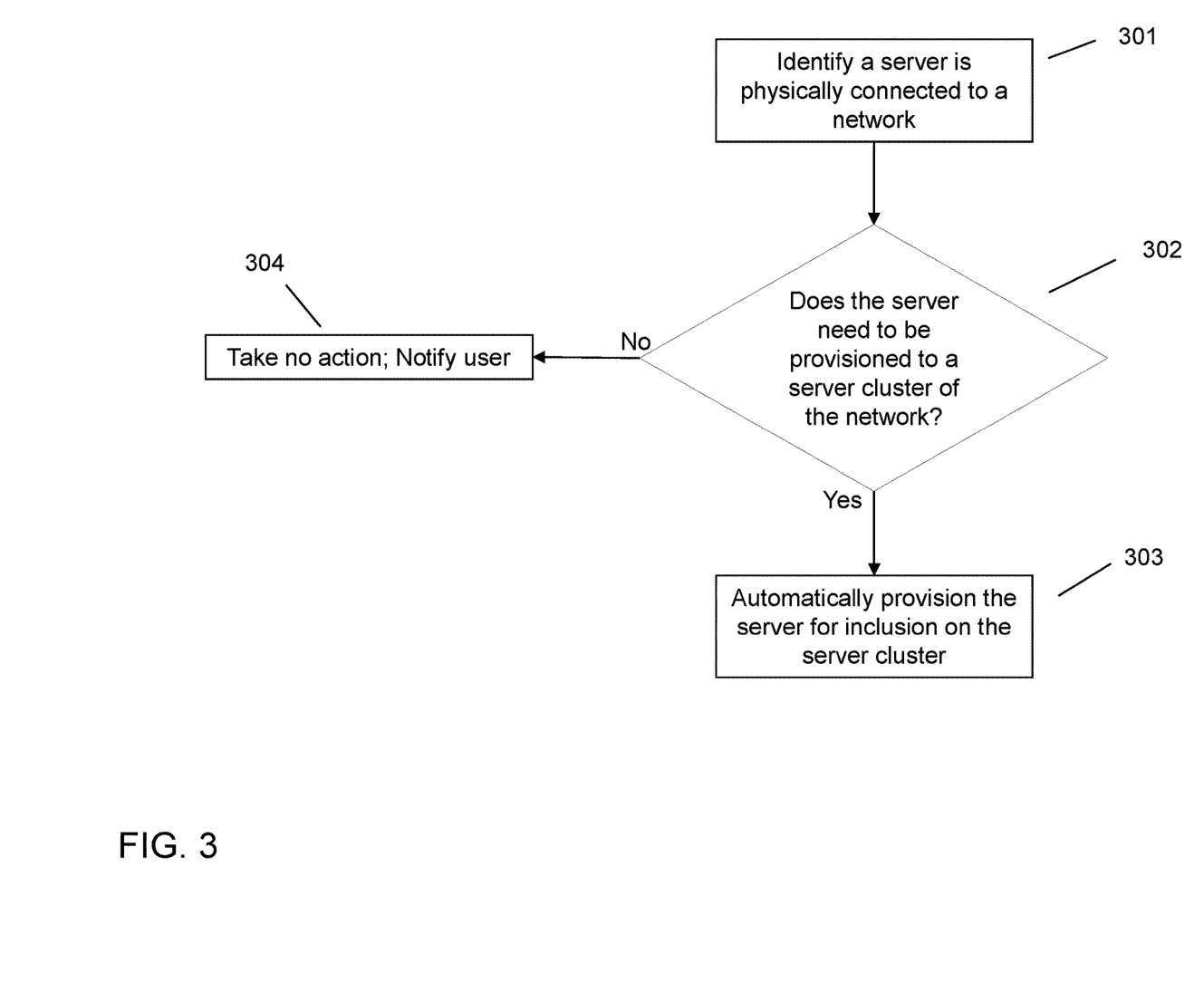
FIG. 3 illustrates an example method for automatically provisioning a server to a server cluster on a network upon identifying a server has been physically connected to the network and determining that the server needs to be provisioned to a server cluster.

FIG. 3 illustrates an example method for automatically provisioning a server to a server cluster on a network upon identifying a server has been physically connected to the network and determining that the server needs to be provisioned to a server cluster. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to automatically provision servers to server clusters on a network. Additionally, the cluster management system includes modules and features that are unique to the described system.

The activation of the cluster management system may be manual, where a user provides an input indicating that the cluster management system should be activated, or automatic where the cluster management system detects a trigger event indicating that the system should be activated. Example trigger events include activation of the server or component of the cluster management system, activation of software or an application utilizing the cluster management system (e.g., feature-on-demand activation, server management software or application, etc.), and/or the like. For example, the cluster management system may be utilized with server management software that it utilized to monitor and manage the server system of an entity. When the server management software is activated or when a new server is detected on the network, the cluster management system may also be activated.

The cluster management system may be a standalone system, may be accessible through other computing devices, and/or a combination thereof. For example, the cluster management system may be a standalone system that can be accessed by a user and/or may be or provide an application that is accessible by a user on another computing device. The cluster management system may be accessible using any type of computing device, for example, personal computer, laptop computer, smartphone, tablet, smartwatch, head-mounted display, smart television or other smart appliance, and/or the like. Thus, the cluster management system may be accessible locally using a computing device where the cluster management system is installed and/or may be accessible remotely through another computing device. For example, the cluster management system may be accessed by a technician working remotely from the server system, the manufacturer of the server, and/or the like.

The cluster management system may have an associated graphical user interface. The graphical user interface may be provided on a display or monitor, which may or may not be associated with the cluster management system. In other words, the cluster management system may have a dedicated display or monitor or may be accessible using any display or monitor. In either case, the cluster management system may provide instructions to generate and display the graphical user interface on the display device being used to access the cluster management system. The graphical user interface may also be updated and managed based upon instructions provided by the cluster management system. In other words, the cluster management system generates and transmits instructions to create and update the graphical user interface.

The graphical user interface may include a plurality of tabs, windows, and/or unique interfaces. The graphical user interface may include graphical user interface icons or elements. Graphical user interface icons or elements may include static non-selectable elements (e.g., headers, footers, logos, global information areas, graphics, etc.), dynamic non-selectable elements (e.g., local information areas applying to a specific element, dynamic graphics, information areas that update based upon the information provided therein, indicators, statistics displays, etc.), static selectable elements (e.g., radio buttons, menu icons, selectable indicators, etc.), dynamic selectable elements (e.g., form field input areas, pull-down menus, pop-up windows, etc.), and/or any other elements that may be found in a graphical user interface.

The graphical user interface may allow a user to provide input identifying information to be used by the cluster management system. For example, the cluster management system may utilize a dictionary, database, or other type of catalog to identify cluster information and configuration information. The graphical user interface may allow for creation of this catalog by allowing a user to input information regarding the network and server clusters. The cluster management system can then utilize these inputs to create the catalog. Additionally, or alternatively, the user can input a location of the catalog, provide a file corresponding to the catalog, and/or the like, within the graphical user interface. Input may be provided by the user using any type of input modality, including, but not limited to, mechanical input (e.g., keyboard input, mouse input, etc.), touch input, audible or voice input, gesture input, haptic input, and/or the like.

The graphical user interface may also provide displays that identify the parameters of the cluster management system, information provided by the network, information provided by the servers or server components, and/or the like. It should be noted that the information to be used by the cluster management system and information provided by the cluster management system can be different for different applications, different computing systems, different users, and/or the like. Thus, the information corresponding to input or output of the cluster management system are not always the same. However, the cluster management system may have default or system-wide settings that are the same across different users, systems, applications, and/or the like, until the information is adjusted or otherwise changed.

It should be noted that different users may configure the graphical user interface per their preferences. Thus, the graphical user interface layout and configuration may be different between users. How much a user can configure the layout may be restricted or set by a system administrator and/or the like. Additionally, different users or different user roles may have different levels of access, which may also change how and what information is displayed. Thus, different graphical user interfaces may be displayed by the system.

The cluster management system may utilize one or more artificial intelligence models in determining that a server needs to be provisioned and how the server should be provisioned for a particular server cluster, for a server cluster type, for a particular client or entity, and/or the like. For ease of readability, the majority of the description will refer to a single artificial intelligence model. However, it should be noted that an ensemble of artificial intelligence models or multiple artificial intelligence models may be utilized. Additionally, the term artificial intelligence model within this application encompasses neural networks, machine-learning models, deep learning models, artificial intelligence models or systems, and/or any other type of computer learning algorithm or artificial intelligence model that may be currently utilized or created in the future.

The artificial intelligence model may be a pre-trained model that is fine-tuned for the cluster management system or may be a model that is created from scratch. Since the cluster management system is used in conjunction with making recommendations and setting parameters, some models that may be utilized by the system are text analysis models, recommender models, filtering models, and/or the like. The model may be trained using one or more training datasets. Additionally, as the model is deployed, it may receive feedback to become more accurate over time. The feedback may be automatically ingested by the model as it is deployed. For example, as the model is used to make recommendations and/or identifications of server clusters that need to be expanded and identify how a server should be provisioned into a server cluster, if a user or technician modifies identification of which server cluster should be expanded or how the server should be provisioned into a server cluster, or otherwise provides some indication that the predictions or selections made by the model may be incorrect, the model ingests this feedback to refine the model.

On the other hand, as the model identifies server clusters to expand and provisions servers into server clusters, and no changes are made to the selected server clusters and/or provisioning settings, the model may utilize this as feedback to further refine the model. Training the model may be performed in one of any number of ways including, but not limited to, supervised learning, unsupervised learning, semi-supervised learning, training/validation/testing learning, and/or the like.

As previously mentioned, an ensemble of models or multiple models may also be utilized. Some example models that may be utilized are variational autoencoders, generative adversarial networks, recurrent neural network, convolutional neural network, deep neural network, autoencoders, random forest, decision tree, gradient boosting machine, extreme gradient boosting, multimodal machine learning, unsupervised learning models, deep learning models, transformer models, inference models, and/or the like, including models that may be developed in the future. The chosen model structure may be dependent on the particular task that will be performed with that model.

The cluster management system may include different components for carrying out different functions of the system, including different steps to be performed. Servers may include management controllers that are processors, groups of processors, or groups of components, that are installed within the server. However, the management controller is separate from the operating system. Thus, the management controller runs separately from the operating system of the server. The management controller provides for advanced management of the server. Additionally, the management controller monitors the server and captures information about the server.

Accordingly, the management controller allows users, including the manufacturer in some cases, to get information from the system. Such information includes, but is not limited to, whether the server is powered on, the temperature of the server, the fan speed of the server, component logs, power usage, and/or the like. This information may be used by the management controller to perform different functions with respect to the server, for example, the management controller can make adjustments to operating parameters, activate different features of the server, provide replacement component alerts, generate logs, display different information, power cycle the server, and/or the like. One example of a management controller is a baseboard management controller (BMC). However, this is a non-limiting example as different types of management controllers are in use and contemplated, for example, the XCLARITY Controller (XCC). XCLARITY is a registered trademark of Lenovo Enterprise Solutions (Singapore) in the United States and other countries.

The management controller may allow for remote technicians, manufacturers, administrators of a network or server cluster, and/or the like, to communicate with and obtain information about the server and also provide instructions to the server. For example, the described cluster management system can communicate with the management controller of the server and obtain information about the server (e.g., installed software, firmware, and components, performance information, security requirements, etc.) and also provide instructions to the server, for example, provisioning instructions.

The servers may be manufactured with the ability to participate in automatic provisioning. Alternatively, or additionally, the servers may be updated so as to allow automatic provisioning. One technique for effectuating the automatic provisioning may be through a Feature on Demand key. Feature on Demand is a license process that can unlock features on a device, in this case, the server. The manufacturer or other entity that provides the automatic provisioning feature can create a license for the feature. The license can be provided or distributed to a customer or other entity that wants to enable the automatic provisioning feature. The license includes a key that the customer or other entity can provide to the server or other system to unlock the automatic provisioning feature. As one example, the automatic provisioning feature may be installed on the management controller and can be disabled. A key can be generated for the feature.

Once the customer or other entity wants to make the feature operable, the manufacturer or entity controlling the automatic provisioning feature can share the key with the customer. The customer can then apply the key to the system which unlocks the automatic provisioning feature. In some cases, manufacturers or other entities that may control the automatic provisioning feature may be able to communicate with the servers or system of the customer even after the server is no longer at the manufacturer. In this case, instead of providing the key directly to the customer or other entity and the customer applying the key to the system, the manufacturer may apply the key to the system remotely.

The management controller, server operating system, and/or other server systems may be accessed using credentials. These credentials may be default credentials set by the manufacturer or may be credentials that are unique to the customer or entity to whose network the server is being installed within. In the case that the credentials are unique to the customer, the customer may have changed the credentials from the default credentials at some point before the server was physically connected to the network or when the server was physically connected to the network. If someone other than the customer is accessing the server, for example, a manufacturer, an entity supporting the server network, an entity hosting the network, and/or the like, the credentials for accessing the server or systems of the server may be shared with the entity other than the customer. Thus, the credentials or other information needed to access the server or server systems may be configurable by an end customer or consumer, client, or other entity and, in the case that the credentials are needed to effectuate the steps and system as described herein, the credentials may be shared with the necessary entities.

The cluster management system may utilize a catalog for determining whether a server needs to be provisioned and determining how to provision the server. The catalog is unique to the entity that corresponds to the network. In other words, each of the networks and corresponding entities have its own catalog that contains and provides information related to the network, server clusters of the network, and parameters of the network and server clusters (e.g., number of server clusters, resources of the server clusters, bandwidth of the network and/or server clusters, performance of the network and/or server clusters, needs of the network and/or server clusters, etc.), so that the system can automatically identify what server cluster to expand and what server should be added to a particular server cluster and how the server should be provisioned to the server cluster. The term catalog will be used here throughout to refer to the catalog, dictionary, database, or other data storage device that is used to store information related to the network, server clusters, and servers. However, this term is not intended to limit this to only a catalog and any data storage device or application for storing data that can be read by a computer is usable. It should also be noted that while a single catalog will be referred to, the information can be contained within a single catalog or across multiple catalogs. Additionally, different entities may each have its own catalog or sets of catalogs.

The catalog contains information and/or metadata that can be used to identify different information regarding the network, servers that need to be provisioned, and provisioning configuration information for the servers to be provisioned. The information related to the network and servers that need to be provisioned will be referred to as cluster information, for ease of readability. The provisioning configuration information for the servers to be provisioned will be referred to as configuration information, for ease of readability. It should be noted that some information that may be referred to as cluster information or configuration information may be used by the cluster management system for making a determination with regard to the other step. In other words, and for example, information that may be utilized to determine that a server needs to be provisioned and to which cluster to provision the server may also be used to identify how to provision the server into a server cluster.

The cluster information helps to identify what server clusters need to be expanded and what servers should be provisioned to what server clusters. Thus, cluster information may include information related to the network, available operating systems, available clusters, methods of managing clusters within the network, a list of provisioned servers, and/or the like. The catalog may provide information identifying which server cluster needs to be expanded. This information may include information regarding the workload of a server cluster, a resource utilization of a server cluster, needs of a server cluster, and/or the like.

The configuration information identifies information identifying how the server should be provisioned into a server cluster. Thus, the configuration information identifies what needs to be done to the server so that it can perform the desired functions within the server cluster. The configuration information may identify requirements of the server that are needed so it can perform the necessary function within the selected server cluster. It may be possible that the server already meets or exceeds some of the configuration information requirements. In this case, the cluster management system will not make any changes to the server with respect to these requirements, but will verify that the server at least meets the requirements of the configuration information. For example, if the configuration information indicates that the server needs to be running a certain version or newer of an application, the cluster management system verifies that the server is running this version or a newer version. If it is not running at least the identified version, the cluster management system undertakes steps to bring the application up to at least the minimum version during the automatic provisioning.

Some examples of configuration information include, but are not limited to, firmware requirements including version requirements, software requirements including version requirements, installed components, resource (e.g., processing, memory, etc.) capabilities, BIOS settings, performance settings, security settings, configuration patterns, and/or the like.

The catalog is unique to the automated technique for server provisioning. In other words, the creation and utilization of a catalog allows the server provisioning process to be performed by a computer and/or processing system and is not a step that is performed by a human. Rather, when a user performs server provisioning, the user knows to which server cluster the server is to be added. The user does not have to access a dictionary, catalog, and/or other type of database to compare server characteristics to server clusters to identify which server cluster needs to be expanded and which server cluster the server fits within. The provision of a dictionary, catalog, and/or other type of database is specifically to allow the described cluster management system to perform the described method for provisioning a server to a server cluster in an automated fashion.

It should be noted that while the majority of the discussion herein describes communication with a single server and provisioning of a single server, the described system can communicate not only with many different servers, but can perform that communication simultaneously. In other words, the described cluster management system can be utilized to provision a plurality of servers at the same time, even if that provisioning includes provisioning different servers to different server clusters. Additionally, the cluster management system has the ability to communicate with the multiple servers at the same time even if some of the servers are at different steps of the process. For example, the cluster management system can be identifying a server cluster that needs expanded for one or more servers while also provisioning other servers to server clusters. Thus, the description of the cluster management system communicating with a single server is merely to enhance readability and is not intended to limit the scope of this disclosure to only communication with a single server at a time.

At 301, the cluster management system identifies a server is physically connected to a network. Identifying that a server is physically connected to a network may be based upon identifying a trigger event has occurred, may be based upon a periodic scanning of the network, and/or the like. Non-limiting examples of trigger events include a technician providing a signal to the system that the server has been connected to the network, a server being added to the catalog corresponding to the network, an update to the network configuration, detection of the server by the system, detection of a system, software, or component of the server by the cluster management system, and/or the like.

The cluster management system may also perform a periodic scan of the network to detect servers that have been added to the network, but that have not yet been provisioned. During the scan, the cluster management system may detect network addresses of devices (including servers) that are on the network, identifiers or other identification information of devices that are on the network, identifiers of components or systems of devices that are on the network, that components of a device are available on the network, and/or the like. For example, during the periodic scan, the cluster management system may identify the identifiers of all the devices on the network. As another example, during the periodic scan, the cluster management system may identify that a component of the device, for example, a management controller, is available on the network. The network can be associated within the component with a device and then infer that the device has been connected to the network. Thus, the periodic scan allows the cluster management system to determine those devices that are connected to the network.

The periodic scan may occur at a predetermined frequency or may occur upon the detection of a trigger event. Examples of trigger events may include those that were previously described in connection to detection of a device or server on the network. However, those are non-limiting examples and other trigger events are contemplated and possible, for example, the system may detect that the network has less network traffic so scanning the network would not overtax the network resources and the scanning may therefor commence based upon this network condition trigger event.

The predetermined frequency may be a default frequency, configured by an end user entity, may vary based upon different conditions, and/or the like. Since scanning the system requires processing resources and time, some entities may configure the scanning that occurs at a predetermined frequency to occur at a lower frequency (i.e., longer times between scans) than other entities. Another reason to reduce the frequency would be if the entity does not add servers or other devices to a network very often. Thus, the predetermined frequency can be any frequency. However, to provide an idea of some frequencies that may be utilized, some non-limiting examples include, every few minutes, every hour, every few hours, daily, every few days, weekly, and/or the like.

Additionally, the frequency may vary based upon different conditions. The conditions may be environmental conditions, customer conditions, network conditions, and/or the like. For example, the frequency may vary based upon the time of day or day of the week. As an example, the frequency may increase at night or on the weekends when the network may have less traffic and more resources to dedicate to scanning the network. Along those lines, if the system detects that the network conditions may be favorable to more frequent scanning, for example, due to less network traffic, the system may increase the frequency of scanning. Additionally, if the system detects that the network conditions have changed, for example, a substantial increase in network traffic as compared to historical network traffic, a change in the network size, a predetermined number of changes to the network being made within a predetermined time frame, and/or the like, the system may perform a scan to determine whether new devices are causing the change in network conditions. Some examples of customer conditions may include, but are not limited to, customer closures, customer working days, customer network audits, and/or the like.

Once the cluster management system has identified the devices that are currently available on the network, the cluster management system may identify that one or more of the devices or servers are "new" for the purposes of server cluster provisioning. To determine whether the device that is accessible or connected to the network is a new server, the cluster management system may compare the servers that were detected on the network from the most recent scan to the servers that were detected on the network from a previous scan. Similarly, the cluster management system may determine that a server has been changed with respect to the network (e.g., changed IP address, changed server clusters, physically changed locations, etc.), based upon differences between information captured by the scans. These changed servers are identified as a "new" server for the purposes of server cluster provisioning.

Other techniques for identifying servers as new servers are contemplated and possible. For example, instead of comparing scans, the servers may have a setting that identifies them as new servers. Thus, the cluster management system would not need to make a comparison between new scans and old scans and would rather simply identify during the scan that the server setting indicates the server as a new server. Additionally, as previously mentioned, during the scan the system may recognize the inclusion and accessibility of a component of the server on the network as opposed to the entire server, for example, the system may detect accessibility of the management controller on the network. As another example, instead of comparing the scan against a previous scan, the system may compare the scan against information included in the catalog. The information included in the catalog may identify those servers which have already been provisioned. Thus, if the server is not listed as a provisioned server, the system identifies it as a server that needs to be provisioned. Delisting a server as provisioned within the catalog can also be used to cause a server to be moved from a previous server cluster to a new server cluster.

After determining that a server is physically connected to a network, the cluster management system may determine whether the server needs to be provisioned to a server cluster of the network at 302. While determining that the server needs to be provisioned usually occurs when the server has been first introduced to the network, the system may also determine that a server needs to be provisioned if the system determines that a server that was previously provisioned to one server cluster needs to be moved to another server cluster. In other words, servers that are newly physically connected to a network generally need to be provisioned, but servers that are being moved from one server cluster to another also need to be provisioned. One situation in which servers may be moved from one server cluster to another is when a new server cluster is created based upon a split of a previous server cluster. As another example, a server cluster may be removed from a network, but the servers within the server cluster can be utilized elsewhere on the network so they are provisioned to a different server cluster, which may either be an existing server cluster or may be a new server cluster.

In the situation where a server is newly connected to the network, identifying that the server needs to be provisioned may simply be based upon the fact that there exists a server without a server cluster on the network. In other words, determining a server needs to be provisioned may include identifying that a server is not currently provisioned on the network. However, other techniques for determining that a server needs to be provisioned are contemplated and possible, for example, by a user or technician setting or changing a particular parameter or setting within the server that indicates the server needs to be provisioned, by a user or technician adding the server to the catalog, detection of the management controller being accessible on the network, and/or the like.

In a situation where the server is being moved from one cluster to another or new cluster, identifying that the server needs to be provisioned may be based upon some indication provided by a user, the network, or the server itself. For example, a user may manually identify the server need to be moved to a different server cluster or may change the status of the server within the catalog. As another example, the user may set a setting or parameter within the server or management controller that indicates the server should be removed from the current server cluster. As a final, non-limiting example, the system may determine that a server within a server cluster is unable to perform the requirements needed by the server cluster, so the system marks the server as needing to be moved.

The system may also infer that the server needs to be moved based upon information related to the network or server clusters. For example, if a network mapping indicates a server cluster is being deleted or removed, the system may infer that all servers contained within that server cluster need to be moved to a new server cluster. As another example, if a technician or user indicates that a server cluster is being removed from the network, the system may infer that all servers within the server cluster need to be moved to a new server cluster. A new server cluster, in this situation, refers to either a server cluster that does not already exist on the network or a server cluster that is new to the server, meaning it previously existed on the network but the server was not previously provisioned to that server cluster. In other words, "new server cluster" with respect to movement of a previously provisioned server refers to a server cluster that is new to the server or any server cluster that is not the server cluster to which the server was previously provisioned.

In determining if the server needs to be provisioned to a server cluster, the system may first determine if the server is set up for automatic provisioning. For example, if the system determines that the server is equipped with the Feature on Demand feature and the automatic provisioning feature is activated via a Feature on Demand key, the system will determine that the server can be automatically provisioned to a server cluster on the network. In other words, if the system identifies that the server comprises a license feature allowing for the server to be automatically configured for inclusion in a server cluster and that the server fulfills the other requirements for server provisioning, the system may determine that the server needs to be provisioned to a network cluster. Other techniques for allowing automatic provisioning are contemplated and possible. For example, the server may be manufactured from the factory allowing for automatic provisioning instead of requiring activation of the feature via a Feature on Demand key.

In determining that the server needs to be provisioned to a server cluster of the network, the server may access the catalog. The catalog provides information that identifies which server cluster or clusters needs to be expanded. Once server clusters that need to be expanded have identified, the cluster management system can determine whether a new server can fulfill the requirements of the server cluster that needs to be expanded. In the case that multiple server clusters are identified as needing expanded and/or multiple servers need to be provisioned, to identify which server cluster to expand or to which server cluster to add the server to, the cluster management system may compare characteristics of the server to the server clusters. Servers can then be provisioned to server clusters based upon a best match between server characteristics and server cluster requirements. For example, if the server has particular processing and memory resources, the cluster management system may identify which of the server clusters need processing and memory resources most closely matching the resources of the server. This is merely an illustrative example as other characteristics/requirements may be compared, for example, but not limited to, installed software and versions, installed firmware and versions, installed components, security features, installed or optional features, and/or the like. The characteristics and requirements may also be weighted when making the comparison and matches.

If the cluster management system determines, at 302, that the server does not need to be provisioned to a server cluster of the network, the system may take no action at 304. Additionally, or alternatively, the system may notify a user of the inability to provision the server to a server cluster to the network or that the server is not going to be provisioned to the network. One situation in which the cluster management system may determine that the server does not need to be provisioned is if the server is not set up to allow automatic provisioning. For example, if the server is equipped with the Feature on Demand feature and the automatic provisioning feature is not activated via a Feature on Demand key, the system will determine that the server cannot and/or should not be automatically provisioned to a server cluster on the network.

Another situation in which the cluster management system may determine that the server does not need to be provisioned is if there is no match between the server and/or characteristics of the server and the cluster information corresponding to the network within the catalog. In other words, if the system cannot identify which server cluster to expand and provision the server to and/or how the server should be provisioned within a server cluster, the system may determine that the server cannot or should not be automatically provisioned.

These situations are merely illustrative and are not intended to limit the scope of the disclosure to only these situations in which the server may not be subject to provisioning as other scenarios are contemplated and possible. Additionally, while the system may determine that the server should not or could not be provisioned at one time, the system may determine that the server can be provisioned at a different or later time. For example, if the system determines that a match exists in the catalog between the server which was previously not provisioned to the network at a later time, the system may then provision the server to the network at the later time.

A notification to a user of the inability to provision a server or a determination that a server should not be provisioned may be any type of notification, including, but not limited to, a visual notification, an audible notification, a haptic notification, and/or the like. Such notifications may be presented within the graphical user interface of the cluster management system. Additionally, or alternatively, the notifications may be transmitted to an administrator, technician, and/or other user using one or more communication mediums (e.g., social media message, email message, text message, phone call with voicemail, etc.). The notifications may also be presented on graphical user interfaces that are not within the cluster management system. For example, the system may cause a pop-up notification to a user within an operating system or application that the user is currently accessing, even if it is not the system directly connected to the cluster management system. The types of notifications, frequencies of notifications, conditions causing notifications, information contained within the notifications, and/or the like, may be set by user or user role. Thus, different users or user roles may receive different notifications.

If, on the other hand, the cluster management system determines, at 302, that the server does need to be provisioned to a server cluster of the network, the system may automatically provision the server for inclusion on the server cluster at 303. Once a server cluster has been identified as needed to be expanded, the cluster management system expands the server cluster that has been identified for the server so that the server can be added to the server cluster. Thus, provisioning the server includes expanding the identified server cluster, adding the server to the expanded server cluster, and then configuring the server to perform functions within the server cluster. Adding the server to the server cluster includes assigning the server to the server cluster so that the server performs functions within the server cluster and so that the server cluster can assign work or functions to the server.

When provisioning the server to the server cluster, the cluster management system configures the server to work within and interface with the server cluster. In order to configure the server, the system may access the server utilizing the credentials associated with the server. As previously mentioned, the credentials may be configured by a user or other entity. Configuring the server includes installing, updating, or otherwise configuring any required software (e.g., operating systems, applications, etc.), installing, updating, or otherwise configuring any required firmware for different components (e.g., hard drive, network cards, power supply units, USB drive, cameras, scanner, etc.), applying any configuration patterns needed for the server cluster or network, updating/setting BIOS settings, updating/setting performance settings, updating/setting security settings, and/or the like.

As previously noted, the provisioning is performed automatically, without user input. Thus, configuring the server may also be performed automatically without user input. In the case that a configuration step requires user input, for example, the installation of a physical component, a requirement for authorization to perform a step, and/or the like, the cluster configuration system may send a notification or request to a user to perform the step, provide the authorization, and/or the like. The notification may be provided on the graphical user interface or provided using one or more of the notification techniques as described in connection with step 304.

After provisioning the server to a server cluster, the cluster management system may perform additional actions. One action includes notifying a cluster administrator or other user that the server has been added to the server cluster. This notification may take any form and may provide varying degrees of information depending on the person notified, settings of people being notified, default settings of the system, and/or the like. The notification may be within the graphical user interface or be of any type of notification as described in connection with step 304. Another action includes updating the catalog with information related to the provisioning of the server. In other words, the cluster management system may update the catalog to indicate that the server has been provisioned and that it is no longer not provisioned. The catalog may also be updated with additional information regarding the provisioning, for example, which cluster the server was provisioned to, the new characteristics of the server cluster, and/or the like. Other actions may also be performed.

As an overall non-limiting example of the described system, a technician may physically add a server to a network. Upon a scan by the cluster management system, the system identifies the server and identifies that it is not in the list of provisioned servers within the catalog. Thus, the cluster management system determines that the server needs to be provisioned to a cluster. Using the catalog, the cluster management system identifies, based upon network information within the catalog, that a particular server cluster needs to be expanded and that the detected server meets the requirements of the server cluster. Alternatively, the cluster management system may determine that the detected server does not meet the requirements of the server cluster but can be updated or otherwise changed to meet the requirements. For example, the cluster management system may determine that a firmware version is out-of-date and needs updating. Since the cluster management system has the ability to update the firmware, the cluster management system determines that the server can be provisioned to the identified server cluster.

Thereafter, the cluster management system expands the server cluster and provisions the server to the server cluster by installing/updating the appropriate firmware and/or software, configuring the server for the server cluster, and otherwise setting up the server for the server cluster. The cluster management system also updates the catalog to identify the server as a provisioned server and notifies the cluster administrator that the server was provisioned to a particular server cluster. The cluster management system also adds the new server to the data center infrastructure management database. All of these actions are performed automatically without requiring the user or technician to perform any steps other than physically connecting the server to the network.

As will be appreciated by one skilled in the art, various aspects may be embodied as a system, method, or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices, and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, the method comprising:
   identifying, using a cluster management system, that a server is physically connected to a network;
   determining, using the cluster management system, that the server be provisioned to a server cluster of the network, wherein the determining utilizes a catalog that is unique to an entity corresponding to the network, the catalog comprising cluster information that includes information related to the network, information about servers of the network, and information related to server clusters of the network, the catalog further comprising configuration information that includes configuration parameters and settings used in provisioning server of the network to server clusters of the network; and
   automatically provisioning, using the cluster management system, the server for inclusion in the server cluster using the configuration information included within the catalog, wherein the automatically provisioning comprises assigning the server to the server cluster based upon identifying, using the cluster information from the catalog, that the server cluster needs to be expanded and automatically expanding the server cluster to accept the server.

2. The method of claim 1, wherein the identifying comprises scanning the network at a predetermined time interval and detecting that the server is present on the network, and wherein the determining comprises identifying that the server is not provisioned to any server cluster on the network.

3. The method of claim 1, wherein the identifying comprises identifying that a management controller associated with the server is available on the network.

4. The method of claim 1, wherein the determining comprises identifying that the server comprises a license feature allowing for the server to be automatically configured for inclusion in a server cluster.

5. The method of claim 1, wherein the automatically provisioning comprises configuring software and firmware of the server.

6. The method of claim 1, wherein the automatically provisioning comprises updating the catalog with information related to the provisioning of the server.

7. The method of claim 1, wherein the automatically provisioning comprises the cluster management system accessing the server utilizing credentials associated with the server, wherein the credentials are configurable.

8. The method of claim 1, wherein the automatically provisioning comprises notifying a user associated with the network that the server has been provisioned on the server cluster.

9. A system, the system comprising:
   a processor;
   a memory device that stores instructions that, when executed by the processor, causes the system to:
   identify, using a cluster management system, that a server is physically connected to a network;
   determine, using the cluster management system, that the server be provisioned to a server cluster of the network, wherein the determining utilizes a catalog that is unique to an entity corresponding to the network, the catalog comprising cluster information that includes information related to the network, information about servers of the network, and information related to server clusters of the network, the catalog further comprising configuration information that includes configuration parameters and settings used in provisioning server of the network to server clusters of the network; and
   automatically provision, using the cluster management system, the server for inclusion in the server cluster using the configuration information included within the catalog, wherein the automatically provisioning comprises assigning the server to the server cluster based upon identifying, using the cluster information from the catalog, that the server cluster needs to be expanded and automatically expanding the server cluster to accept the server.

10. The system of claim 9, wherein the identifying comprises scanning the network at a predetermined time interval and detecting that the server is present on the network, and wherein the determining comprises identifying that the server is not provisioned to any server cluster on the network.

11. The system of claim 9, wherein the identifying comprises identifying that a management controller associated with the server is available on the network.

12. The system of claim 9, wherein the determining comprises identifying that the server comprises a license feature allowing for the server to be automatically configured for inclusion in a server cluster.

13. The system of claim 9, wherein the automatically provisioning comprises configuring software and firmware of the server.

14. The system of claim 9, wherein the automatically provisioning comprises updating the catalog with information related to the provisioning of the server.

15. The system of claim 9, wherein the automatically provisioning comprises the cluster management system accessing the server utilizing credentials associated with the server, wherein the credentials are configurable.

16. A product, the product comprising:
   a computer-readable storage device that stores executable code that, when executed by a processor, causes the product to:
   identify, using a cluster management system, that a server is physically connected to a network;
   determine, using the cluster management system, that the server be provisioned to a server cluster of the network, wherein the determining utilizes a catalog that is unique to an entity corresponding to the network, the catalog comprising cluster information that includes information related to the network, information about servers of the network, and information related to server clusters of the network, the catalog further comprising configuration information that includes configuration parameters and settings used in provisioning server of the network to server clusters of the network; and automatically provision, using the cluster management system, the server for inclusion in the server cluster using the configuration information included within the catalog, wherein the automatically provisioning comprises assigning the server to the server cluster based upon identifying, using the cluster information from the catalog, that the server cluster needs to be expanded and automatically expanding the server cluster to accept the server.

* * * * *